Jan. 8, 1929.
H. BANY
1,698,292
AUTOMATIC CONTROL SYSTEM
Filed Oct. 3, 1927
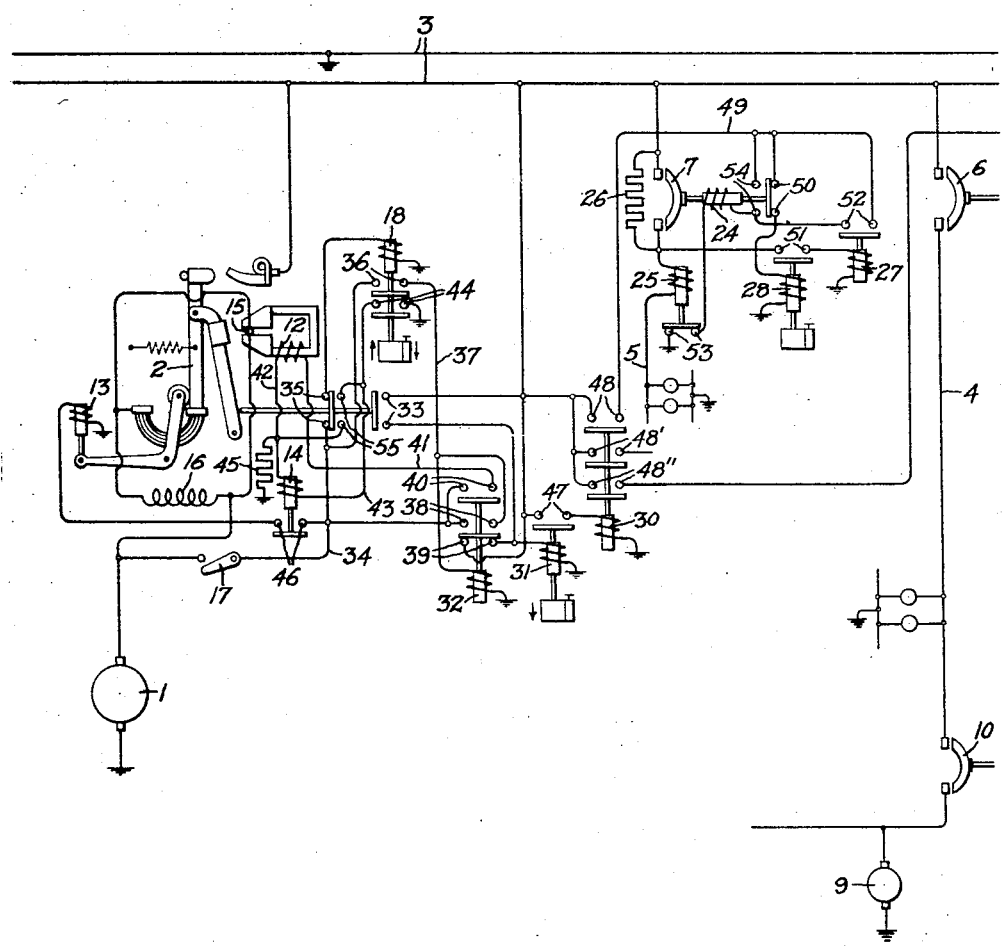
Inventor:
Herman Bany,
by [signature]
His Attorney.

Patented Jan. 8, 1929.

1,698,292

UNITED STATES PATENT OFFICE.

HERMAN BANY, OF YEADON, PENNSYLVANIA, ASSIGNOR TO GENERAL ELECTRIC COMPANY, A CORPORATION OF NEW YORK.

AUTOMATIC CONTROL SYSTEM.

Application filed October 3, 1927. Serial No. 223,303.

My invention relates to automatic control systems, and particularly to a system for controlling the connection between a load circuit and a supply circuit, such as a load bus, which is arranged to be energized by a plurality of sources.

In certain systems of electric distribution it is the practice to supply current to a plurality of feeders from a common load bus which is supplied from a local source. In order to reduce the duty on the circuit breakers in the feeders they are made relatively slow acting, whereas the circuit breaker between the source and the load bus is made relatively quick acting. With such an arrangement a predetermined abnormal load on feeder causes the relatively quick-acting circuit breaker between the source and the load bus to open and reduce the current supplied to the faulty feeder before the circuit breaker in the faulty feeder opens. In order to insure that the relatively quick-acting circuit breaker between the source and load bus is not closed under load conditions which will cause it to open immediately after it is reclosed, it is customary to interlock the various circuit breakers so that all of the feeder breakers are opened whenever the circuit breaker between the source and load circuit opens under certain conditions of overload and so that the feeder circuit breakers cannot be reclosed until after the relatively quick-acting circuit breaker has been reclosed.

In some certain systems of the feeders which are adapted to be connected to the load bus are also supplied with current at other points. In such systems it is desirable to be able to connect all of the feeders to the common load bus when the local source is not connected thereto so that the stub end feeders may receive current from those that are energized at other points.

One object of my invention is to provide in such a system of electric distribution an arrangement whereby the opening of the circuit breaker between the local source and the load bus in response to certain conditions effects the opening of the feeder circuit breakers and whereby the opening of the circuit breaker between the local source and the load bus in response to certain other conditions does not effect the opening of the feeder circuit breakers.

In accordance with one embodiment of my invention I provide an arrangement whereby all of the feeder breakers are opened when the circuit breaker between the source and the load bus is opened in response to an abnormal load and whereby the feeder circuits are not opened when the circuit breaker between the source and load bus is opened in response to the operation of a control switch or other suitable device which may be operated to effect the opening of the circuit breaker between the source and load bus irrespectively of the load conditions.

My invention will be better understood from the following description taken in connection with the accompanying drawing, and its scope will be pointed out in the appended claims.

Referring to the accompanying drawing, 1 represents a source of current which is arranged to be connected by suitable switching means 2 to a load bus 3, which in turn is arranged to be connected to two feeders 4 and 5 by suitable switching means 6 and 7 respectively. It is obvious, however, that as far as my invention is concerned the number of feeders that may be supplied from the load bus 3 is immaterial. As shown in the drawing, the feeder 5 is a stub end feeder whereas the feeder 4 is arranged to be supplied from another source 9 through a suitable switching means 10.

As shown in the drawing, the switching means 2 is a circuit breaker of a quick-acting type well known in the art and comprises a holding coil 12, a closing coil 13, an auxiliary relay 14 for the closing coil 13, a flux diverting coil 15 connected in series with the main contacts of the circuit breaker, and a reactor 16 connected in shunt around the flux diverting coil 15. As is well known in the art, this reactor 16 causes the circuit breaker 2 to open in response to a lower value of current under short circuit conditions than under normal overload conditions. 17 is a manual control switch which, when closed, effects the closing of the circuit breaker 2 and, when open, effects the opening of the circuit breaker 2. 18 is an auxiliary time relay associated with the circuit breaker 2 for controlling the automatic reclosing thereof.

The feeder switching means 6 and 7 may be of any suitable type, examples of which are well known in the art. Since both of these switches may be controlled in the same manner, I have shown in detail only the control arrangement for the switch 7 in order to simplify the disclosure. The switch 7 is shown as a circuit breaker of the contactor type which is closed when its closing coil 24 is energized. For effecting the opening of the circuit breaker 7 when an overload occurs on the feeder 5, I provide an over-current relay 25 which is connected and arranged so as to open the circuit of the closing coil 24 when the current through the circuit breaker 7 exceeds a predetermined value. Since it is desirable not to close the circuit breaker 7 when there is an abnormal load connected to the feeder 5, the circuit breaker 7 is provided with a suitable automatic reclosing arrangement whereby it can reclose only under predetermined normal load conditions of the feeder. As shown, the reclosing equipment comprises a load indicating resistor 26 which is arranged to be connected between the load bus 3 and the feeder 5 so as to limit the current flowing between them to a relatively small value when the circuit breaker 7 is open, a reclosing relay 27 which is responsive to the voltage across the feeder and which completes the circuit of the closing coil 24 when the voltage across the load circuit is above a predetermined value, and a time relay 28 which is arranged to render the reclosing relay 27 operative to effect the closing of the circuit breaker only after the circuit breaker has been open a predetermined length of time.

In order that the feeder circuit breakers may be selectively controlled in accordance with the operation of the circuit breaker 2, I provide the control relays 30, 31, and 32 which are so connected and arranged as to accomplish the desired operation of the feeder circuit breakers. The control relay 30 when energized controls contacts in the closing coil circuit of each feeder circuit breaker and the time relay 28 associated therewith so that the control relay 30 has to be energized in order for any of the feeder breakers to be closed. The control relay 31 is arranged so that it is energized in accordance with the position of the circuit breaker 2 when the control switch 17 is closed. When the circuit breaker 2 is open and the control switch 17 is closed the control relay 31 is deenergized and the contacts controlled thereby, which are in the circuit of the control relay 30, are open so that the control relay 30 is deenergized. When the circuit breaker 2 is closed a circuit for the control relay 31 is completed through the auxiliary contacts 33 on the circuit breaker 2 so that the relay 31 is energized and completes the circuit of the control relay 30. The control relay 32 is controlled by the position of the control switch 17 and is arranged to complete a circuit for the control relay 31 independently of the position of the circuit breaker 2 whenever the control switch 17 is open.

The operation of the arrangement shown in the drawing is as follows: It will be assumed that the load bus 3 is deenergized, that the circuit breakers 2, 6, and 7 are open and that the control switch 17 is closed to effect the connection of the source 1 to the load bus 3. When the control switch 17 is closed a circuit is completed for the time relay 18 from the ungrounded terminal of the source 1 through the control switch 17, conductor 34, auxiliary contacts 35 on circuit breaker 2, coil of control relay 18 to the grounded terminal of the source 1. After a predetermined time relay 18 closes its contacts. By closing its contacts 36 relay 18 completes a circuit for the control relay 32 from the ungrounded terminal of the source 1 through control switch 17, conductor 34, contacts 36 of relay 18, conductor 37, coil of control relay 32 to the grounded terminal of the source 1. Relay 32 by closing its contacts 38 completes a locking circuit for itself, which is independent of the contacts 36 of relay 18, so that the relay 32 remains energized when the relay 18 subsequently opens its contacts 36 in response to the closing of the circuit breaker 2. Relay 32 by opening its contacts 39 disconnects the coil of the control relay 31 from across the load bus 3 which, it is assumed, is deenergized. Relay 32 by closing its contacts 40 completes a circuit for the holding coil 12 of the circuit breaker 2 and the auxiliary relay 14 associated with closing coil 13 of the circuit breaker 2. This circuit is from the ungrounded terminal of the source 1 through the control switch 17, conductor 34, contacts 40 of relay 32, conductor 41, holding coil 12 of circuit breaker 2, conductor 42, coil of relay 14, conductor 43, contacts 44 of relay 18 to the grounded terminal of the source 1. A portion of the current that flows through the holding coil 12 also flows through a resistor 45 which is connected in shunt around the coil of relay 14, conductor 43 and contacts 44 of relay 18. The resistor 45, however, is of such a value that sufficient current flows through the coil of relay 14 to cause it to close its contacts 46, thereby completing a circuit for the closing coil 13 of the circuit breaker 2. This circuit is from the ungrounded terminal of the source 1 through the control switch 17, conductor 34, contacts 46 of relay 14, closing coil 13 to the grounded terminal of the source 1. The energization of the closing coil 13 closes the circuit breaker 2 so that the source 1 is connected to the load bus 3. In order to increase the excitation of the holding coil 12 during the closing operation, the circuit breaker 2 by closing its auxiliary contacts 55 connects together conductors 42 and 43 and thereby short circuits relay 14 and resistor 45 as long as relay 18 remains closed after the closing of the circuit breaker 2.

The circuit breaker 2 by opening its auxiliary contacts 35 effects the deenergization of the relay 18, which after a predetermined time opens its contacts 36 and 44. The opening of the contacts 36 does not effect the deenergization of the relay 32 since this relay has completed in the manner heretofore described a holding circuit for itself through its contacts 38. The opening of the contacts 44 interrupts the short circuit around the auxiliary relay 14. As soon as the relay 14 was short circuited by the closing of the contacts 55 it opened the circuit of the closing coil 13. After the closing coil 13 is deenergized the circuit breaker 2 is held in its closed position by the energization of the holding coil 12, the circuit of which remains completed through the resistor 45 after the relay 18 opens its contacts 44.

The circuit breaker 2 by closing its auxiliary contacts 33 connects the coil of the relay 31 directly across the load bus 3 which is now energized by the source 1. Therefore, the relay 31 immediately closes its contacts 47 thereby connecting the coil of the relay 30 across the load bus 3. Relay 30 by closing its contacts 48 completes a circuit for the time relay 28 associated with the circuit breaker 7. This circuit is from the ungrounded side of the load bus through contacts 48 of relay 30, conductor 49, auxiliary contacts 50 on circuit breaker 7, coil of time relay 28 to the grounded side of the load bus 3. After a predetermined time, relay 28 closes its contacts 51 and connects the coil of the reclosing relay 27 across the feeder 5. If the load connected to the feeder 5 is less than a predetermined value, the voltage across the feeder is sufficient to cause the relay 27 to close its contacts 52 and complete the circuit for the closing coil 24 of the circuit breaker 7. This circuit is from the ungrounded side of the load bus through contacts 48 of relay 30, conductor 49, contacts 52 of relay 27, closing coil 24, contacts 53 of over-current relay 25 to the grounded terminal of the load bus 3. The energization of the closing coil 24 closes the circuit breaker 7 so that the load bus 3 is directly connected to the feeder 5. The circuit breaker 7 by closing its auxiliary contacts 54 completes a holding circuit for its closing coil 24 which is independent of contacts 52 of relay 27. As soon as circuit breaker 7 closes, relay 28 is deenergized and opens the circuit of relay 27.

The relay 30 by closing its contacts 48′ and 48″ effects the reclosing of the other feeder circuit breakers in the same manner as above described in connection with feeder breaker 7.

It will now be assumed that a fault occurs on the feeder 5 which causes sufficient current to flow through the flux diverting coil 15 of circuit breaker 2 to open the circuit breaker. This fault may also cause the over-current relay 25 in the feeder circuit 5 to open its contacts 53, but since the circuit breaker 2 is a relatively quick-acting circuit breaker it will open its main contacts before the circuit breaker 7 can open. The circuit breaker 2 by opening its auxiliary contacts 33 opens the circuit of the control relay 31, which in turn by opening its contacts 47 opens the circuit of the control relay 30. The relay 30 in turn opens its contacts 48, 48′, etc. in the circuits of the closing coils of all of the feeder circuit breakers. Therefore, whenever the circuit breaker 2 opens in response to an abnormal load condition on any of the feeders all of the feeder breakers are opened.

As soon as the circuit breaker 2 closes its auxiliary contacts 35 the above traced circuit for the control relay 18 is completed. After a predetermined time which is long enough to allow all of the feeder circuit breakers to open, the relay 18 again closes its contacts and effects in the manner above described the closing of the circuit breaker 2 and the subsequent closing of the feeder circuit breakers.

When circuit breaker 2 is closed and the control switch 17 is opened the above traced circuit for the holding coil 12 is opened so that the circuit breaker 2 opens. The circuit of the control relay 32 is also interrupted when the control switch 17 is opened, and by closing its contacts 39 the relay 32 connects the coil of the control relay 31 directly across the load bus 3. Therefore, if the load bus 3 is supplied from some other source at this time so that the voltage thereof is substantially normal the control relay 31 is not deenergized when the circuit breaker 2 opens its auxiliary contacts 33. In order that the relay 32 may have sufficient time to close its contacts 39 before the relay 31 can operate to open its contacts 47, in response to the opening of the auxiliary contacts 33 on the circuit breaker 2, the relay 31 is designed in any suitable manner so that it does not open its contacts until after its coil has been deenergized for a certain length of time. It will be observed, therefore, that when the circuit breaker 2 is opened by the opening of the control switch 17 the control relays 30 and 31 are not deenergized to effect the opening of the feeder breakers, but when the circuit breaker 2 is opened in response to an abnormal load the control relays 30 and 31 are deenergized to effect the opening of the feeder breakers.

While I have in accordance with the patent statutes shown and described my invention as applied to a particular system and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States, is,—

1. In combination, a source of current, a load bus, a circuit breaker between said source and load bus, control means for effecting the opening of said circuit breaker, other control means for effecting the opening of said circuit breaker, a load circuit, a circuit breaker between said load bus and said load circuit, and means for selectively controlling the operation of the circuit breaker between the load bus and the load circuit in accordance with which of said control means effects the opening of the circuit breaker between the source and the load bus.

2. In combination, a source of current, a load bus, a circuit breaker between said source and load bus, overload responsive means for effecting the opening of said circuit breaker, control means for effecting the opening of said circuit breaker, a load circuit, a circuit breaker between said load bus and said load circuit normally arranged to be opened in response to the opening of the circuit breaker between the source and the load bus, and means controlled by said control means for maintaining the circuit breaker between said load bus and load circuit closed when the circuit breaker between the source and the load bus is opened in response to the operation of said control means.

3. In combination, a load bus arranged to be supplied with current at a plurality of points, a source of current, an automatic reclosing circuit breaker between said source and load bus, a control device for controlling the operation of said circuit breaker, a load circuit, a circuit breaker between said load bus and said load circuit, means controlled by the position of said automatic reclosing circuit breaker for effecting the opening and closing of the circuit breaker between the load bus and the load circuit, and means controlled by said control device and the voltage of said load bus for controlling the operation of the circuit breaker between the load bus and load circuit independently of the position of the automatic reclosing circuit breaker.

4. In combination, a source of current, a load bus, an automatic reclosing circuit breaker between said source and load bus, a control device for controlling the operation of said circuit breaker, a load circuit, a circuit breaker between said load bus and said load circuit, a control relay for controlling the operation of the circuit breaker between said load bus and said load circuit, a circuit for said control relay controlled by the position of said automatic reclosing circuit breaker, and another circuit for said control relay controlled by said control device for maintaining the circuit breaker between said load bus and load circuit closed independently of the position of the automatic reclosing circuit breaker.

5. In combination, a source of current, a load bus, a load circuit adapted to be connected to said load bus, means for connecting said source to said load bus, means for connecting said load circuit to said load bus, means for effecting the opening of said connecting means of said load circuit when said connecting means of said source opens under predetermined load conditions, and means for effecting the opening of said connecting means of said source without effecting the opening of said connecting means of said load circuit.

6. In combination, a source of current, a load bus, a load circuit, a circuit breaker for connecting said source to said load bus, means for controlling said circuit breaker, a circuit breaker for connecting said load circuit to said load bus, an electromagnetic device with time delay drop-out characteristics arranged to be energized both when said circuit interrupter of said source is closed and when the control means of said circuit interrupter of said source is in a predetermined position, and a second electromagnetic device controlled by the first mentioned electromagnetic device for effecting the opening of said circuit interrupter of said load circuit when said second electromagnetic device is deenergized.

7. In combination, a source of current, an electric circuit, a load circuit adapted to be connected to said electric circuit, a circuit interrupter for connecting said source to said electric circuit, a circuit interrupter for connecting said load circuit to said electric circuit, means for effecting the opening of said circuit interrupter of said source in response to predetermined conditions of the load circuit, means for controlling said circuit interrupter of said source, means for effecting the opening of said circuit interrupter of said load circuit when said circuit interrupter of said source is opened in response to predetermined load conditions, and means to retain said circuit interrupter of said load circuit closed when said circuit interrupter of said source is opened by said control means of said circuit interrupter.

In witness whereof, I have hereunto set my hand this 29th day of September, 1927.

HERMAN BANY.

CERTIFICATE OF CORRECTION.

Patent No. 1,698,292.   Granted January 8, 1929, to

HERMAN BANY.

It is hereby certified that error appears in the printed specification of the above numbered patent requiring correction as follows: Page 1, line 34, for the words "certain systems" read "systems certain"; and that the said Letters Patent should be read with this correction therein that the same may conform to the record of the case in the Patent Office.

Signed and sealed this 19th day of February, A. D. 1929.

(Seal)

M. J. Moore,
Acting Commissioner of Patents.